(12) United States Patent
Yamagishi

(10) Patent No.: US 7,916,417 B2
(45) Date of Patent: Mar. 29, 2011

(54) MAGNETIC DISK APPARATUS AND RECORDING METHOD

(75) Inventor: Michinaga Yamagishi, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 118 days.

(21) Appl. No.: 12/490,986

(22) Filed: Jun. 24, 2009

(65) Prior Publication Data
US 2010/0014180 A1 Jan. 21, 2010

(30) Foreign Application Priority Data
Jul. 16, 2008 (JP) ................................ 2008-185340

(51) Int. Cl.
*G11B 19/02* (2006.01)
(52) U.S. Cl. ........................................................ 360/69
(58) Field of Classification Search .................... 360/69, 360/39, 40, 48, 53, 55, 62, 66, 75
See application file for complete search history.

(56) References Cited

U.S. PATENT DOCUMENTS

| 5,331,612 | A * | 7/1994 | Murakami et al. ......... 369/13.24 |
| 5,719,719 | A * | 2/1998 | Tsuyoshi et al. ................ 360/66 |
| 6,816,617 | B2 * | 11/2004 | Yamori et al. ................ 382/236 |
| 7,003,116 | B2 * | 2/2006 | Riedel et al. .................. 380/277 |
| 7,013,304 | B1 * | 3/2006 | Schuetze et al. ..................... 1/1 |
| 7,826,164 | B2 * | 11/2010 | Morikawa ........................ 360/75 |
| 2010/0014180 | A1 * | 1/2010 | Yamagishi ..................... 360/69 |

FOREIGN PATENT DOCUMENTS
JP  A 2008-77717  4/2008

* cited by examiner

*Primary Examiner* — Fred Tzeng
(74) *Attorney, Agent, or Firm* — Greer, Burns & Crain, Ltd.

(57) ABSTRACT

A magnetic disk apparatus includes a computing unit that obtains data to be recorded on a magnetic disk and computes an intermediate bit length based on a longest bit length and a shortest bit length of bit lengths of the obtained data; an adjusting unit that adjusts a strength of a recording current for recording the obtained data based on a difference between the intermediate bit length and a bit length of the obtained data; and a recording unit that repeatedly detects an error rate for recording data by using the adjusted recording current while narrowing down a track width on the magnetic disk and records the obtained data with a track width corresponding to an error rate detected immediately before an error rate that is detected to be equal to or greater than a predetermined value.

8 Claims, 6 Drawing Sheets

BIT LENGTH MANAGEMET TABLE 250b

FIG.5

RECORDING CURRENT MANAGEMENT TABLE 250c

RELATED ART

US 7,916,417 B2

MAGNETIC DISK APPARATUS AND RECORDING METHOD

CROSS-REFERENCE TO RELATED APPLICATION

This application is based upon and claims the benefit of priority of the prior Japanese Patent Application No. 2008-185340, filed on Jul. 16, 2008, the entire contents of which are incorporated herein by reference.

FIELD

The embodiments discussed herein are directed to a magnetic disk apparatus and a recording method, which use a magnetic disk to record data.

BACKGROUND

In recent years, a magnetic disk apparatus has been widely used as a storage device for a computer. The magnetic disk apparatus rotates at high speed an aluminum or glass magnetic disk, on which a magnetic material is applied, by a motor and irradiates a magnetic field to a track on the magnetic disk by a magnetic head to record data (for example, see Japanese Laid-open Patent Publication No. 2008-77717). The magnetic disk apparatus may be one that records data with a track pitch of the magnetic disk fixed. The magnetic disk apparatus may also be an archive hard disk drive (HDD) that records data by narrowing down a track width to increase a recording density.

However, a conventional method performed by such an archive HDD that records data by narrowing down a track width of a magnetic disk tends to be influenced by a track edge due to variation in the track width.

The track width of the magnetic disk increases as a bit length increases because a magnetic field for recording the data is increased as the bit length increases. The track width of the magnetic disk decreases as the bit length decreases. Normally, data may have any bit length. Thus the track width varies depending on the bit length. Since the track width generally varies, a track edge is not smooth and changes.

Figure 7:
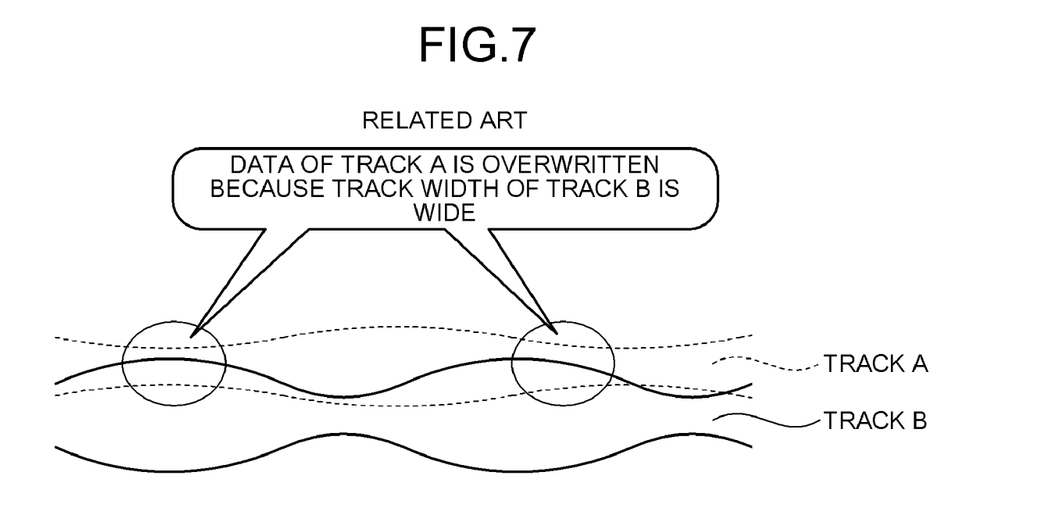
FIG. 7 is an explanatory diagram for a problem in a conventional technology.

FIG. 7 is an explanatory diagram for a problem in a conventional technology. Because the archive HDD records the data while narrowing down the track width, the track width does not have much margin. In the worst case, as the track width varies, previously recorded data may be overwritten by other data. In an example illustrated in FIG. 7, an area of a track A having a narrow track width is overwritten by an area of a track B having a wide track width.

Therefore, to increase a recording density by narrowing down a track pitch to record data as by the archive HDD, it is important to optimize the track width.

SUMMARY

According to an aspect of the invention, a magnetic disk apparatus includes a computing unit that obtains data to be recorded on a magnetic disk and computes an intermediate bit length based on a longest bit length and a shortest bit length of bit lengths of the obtained data; an adjusting unit that adjusts a strength of a recording current for recording the obtained data based on a difference between the intermediate bit length and a bit length of the obtained data; and a recording unit that repeatedly detects an error rate for recording data by using the adjusted recording current while narrowing down a track width on the magnetic disk and records the obtained data with a track width corresponding to an error rate detected immediately before an error rate that is detected to be equal to or greater than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of the present invention will be explained in detail below with reference to the accompanying drawings.

[a] First Embodiment

First, an outline of a magnetic disk apparatus according to the first embodiment will be explained. The magnetic disk apparatus according to the first embodiment, upon recording data while narrowing down a track width of a magnetic disk, decreases a recording current by an amount corresponding to an increase in a bit length of the data to be recorded and increases the recording current by an amount corresponding to a decrease in the bit length of the data. The magnetic disk apparatus records the data using the recording current while changing the track width and narrowing down the track pitch, determines a track width immediately before a track width at which an error rate of recorded data becomes equal to greater than a predetermined value, and writes the data on the magnetic disk by using the determined track width and the adjusted recording current.

Accordingly, because the magnetic disk apparatus according to the first embodiment determines the track width immediately before the track width at which the error rate becomes equal to or greater than the predetermined value while adjusting the recording current, the magnetic disk apparatus is able to efficiently optimize the recording current and the track width.

Figure 1:
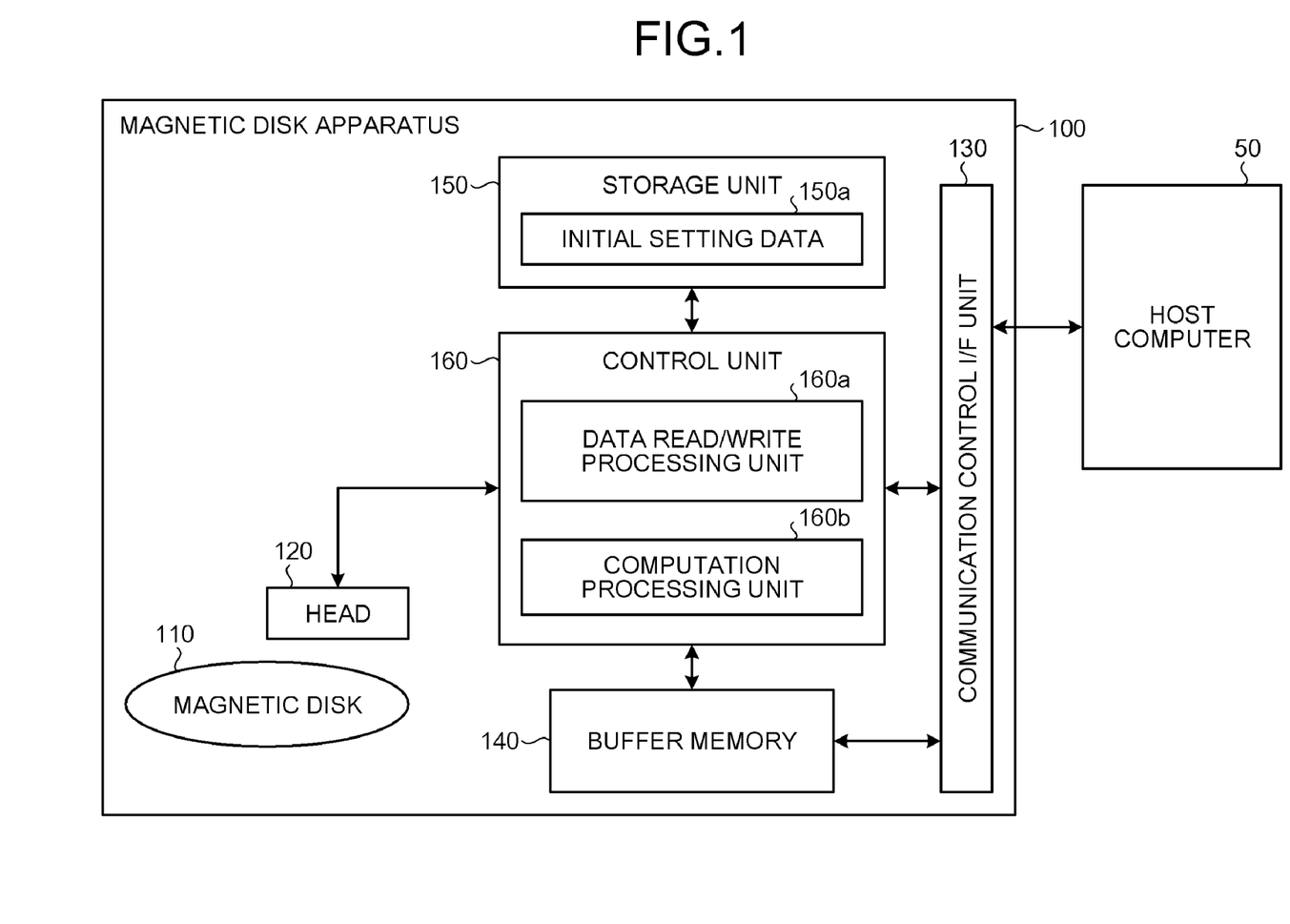
FIG. 1 is a functional block diagram of a configuration of a magnetic disk apparatus according to a first embodiment.

A configuration of the magnetic disk apparatus according to the first embodiment will be explained. FIG. 1 is a functional block diagram of a configuration of a magnetic disk apparatus 100 according to the first embodiment. As illustrated in FIG. 1, the magnetic disk apparatus 100 includes a magnetic disk 110, a head 120, a communication control I/F unit 130, a buffer memory 140, a storage unit 150, and a control unit 160. Because other structural elements of the magnetic disk apparatus 100 are similar to those of a well-known magnetic disk apparatus, descriptions thereof are omitted.

The magnetic disk 110 is a disk on which a magnetic material has been applied or vapor-deposited. On the magnetic disk 110, information is recorded by magnetizing the magnetic material on the magnetic disk 110 using the head 120. The head 120 is controlled by the control unit 160, and performs recording and reading of data on and from the magnetic disk 110.

The communication control I/F unit 130 controls data communications between the magnetic disk apparatus 100 and a host computer 50. The buffer memory 140 temporarily stores therein data to be recorded on the magnetic disk 110 or data read from the magnetic disk 110.

The storage unit 150 stores therein data, and a program or programs required for various types of processes by the control unit 160. Particularly, the storage unit 150 according to the first embodiment stores therein initial setting data 150a.

The initial setting data 150a is utilized to compute an optimum track width and an optimum recording current by a computation processing unit 160b. Specifically, the initial setting data 150a includes a longest bit length (Na bits), a shortest bit length (Nb bits), an initial recording current value Iwo, a single track width TWo (TWopt), and a target error rate ERRo.

The longest bit length is a longest one of bit lengths of data recorded in the buffer memory 140 (data to be recorded on the magnetic disk 110). The shortest bit length is a shortest one of the bit lengths of the data recorded in the buffer memory 140 (data to be recorded on the magnetic disk 110).

The control unit 160 controls the head 120 to perform recording and reading of data on and from the magnetic disk 110. Particularly, the control unit 160 according to the first embodiment optimizes a track width and a recording current upon recording data while narrowing down the track width. As illustrated in FIG. 1, the control unit 160 includes a data read/write processing unit 160a and the computation processing unit 160b.

The data read/write processing unit 160a controls the head 120 to perform the recording and reading of data on and from the magnetic disk 110. The data read/write processing unit 160a performs the recording of data based on the optimum track width and recording current computed by the computation processing unit 160b. Data to be recorded is stored in the buffer memory 140. The data read/write processing unit 160a reads data recorded on the magnetic disk 110 and stores the read data in the buffer memory 140.

The computation processing unit 160b computes a track width and a recording current for recording data on the magnetic disk 110. The computation processing unit 160b outputs information on the computed track width and recording current to the data read/write processing unit 160a. Procedural steps carried out by the computation processing unit 160b will be specifically explained. First, the computation processing unit 160b obtains the data recorded in the buffer memory 140 (data to be recorded on the magnetic disk 110), calculates the longest bit length and the shortest bit length, and registers the calculated bit lengths in the initial setting data 150a.

Next, the computation processing unit 160b computes a change amount of recording current to be changed (hereinafter, "an amount of current change $\Delta Iw$") to derive an optimum recording current. The amount of current change $\Delta Iw$ may be computed by an equation (1) indicated below.

$$\Delta Iw = Iwo/\Delta N \quad (1)$$

In the equation (1), Iwo is an initial recording current value Iwo registered in the initial setting data 150a, and $\Delta N$ is a difference between the longest bit length and the shortest bit length i.e., $\Delta N = Na - Nb$.

The computation processing unit 160b computes a change amount of track width to be changed (hereinafter, "an amount of track-width change $\Delta TW$") to derive an optimum track width. The amount of track-width change $\Delta TW$ can be computed by an equation (2) indicated below.

$$\Delta TW = TWo/M \quad (2)$$

In the equation (2), TWo is a single track width TWo registered in the initial setting data 150a, and M is an arbitrary number set by an administrator.

The computation processing unit 160b computes a recording current tailored to a bit length of data to be recorded. A recording current Iw may be computed by an equation (3) indicated below.

$$Iw = Iwo + S(Nm - K)\Delta Iw \quad (3)$$

In the equation (3), S is a weight, and Nm is an intermediate bit length Nm between the longest bit length and the shortest bit length, where $Nm = (Na + Nb)/2$. K is a bit length, where $Nb \leq K \leq Na$, of the data to be recorded.

According to the equation (3), for example, as the bit length of the data to be recorded increases and thus becomes larger than the intermediate bit length, the initial recording current value is subtracted and the recording current becomes small by the subtraction. As the bit length of the data to be recorded decreases and thus becomes smaller than the intermediate bit length, the initial recording current value is added and the recording current becomes larger by the addition. Variation in the track width is thus suppressed by this adjustment of the recording current.

Next, the computation processing unit 160b calculates the optimum track width for recording the data on the magnetic disk 110. The computation processing unit 160b decreases the single track width TWo by $\Delta TW$ and additionally records n tracks (for example, three tracks) each having a new track width of $TW = TW - \Delta TW$ by using the recording current Iw tailored to the bit length of random data.

The computation processing unit 160b detects an error rate EER of a middle track of the n tracks additionally recorded. If the detected error rate is smaller than the target error rate (ERRo), the computation processing unit 160b further shifts a track position by $\Delta TW$ to narrow down the track width, and further additionally records n tracks having the narrowed track width.

The computation processing unit 160b repeatedly performs the additional recording until the error rate becomes equal to or greater than the target error rate. The computation processing unit 160b sets a track width immediately before a track width for which the error rate becomes equal to or greater than the target error rate, as a minimum track width TWmin. In other words, as the additional recording is repeated, the computation processing unit 160b finally obtains the error rate that is equal to or greater than the target error rate. The computation processing unit 160b then sets, as the minimum track width TWmin, the track width tried (additionally recorded) immediately before the track width corresponding to the error rate equal to or greater than the target error rate.

When the set minimum track width TWmin is smaller than an optimum track width value TWopt, the computation processing unit 160b replaces the values of TWmin and TWopt with new values and changes the weight S in the equation (3)

to calculate a recording current and a minimum track width TWmin again. An initial value of the optimum track-width value TWopt is set by the administrator.

If the set minimum track width TWmin is equal to or greater than the optimum track-width value TWopt, the computation processing unit 160b outputs the track width TWopt as an optimum track width to the data read/write processing unit 160a. The computation processing unit 160b further outputs a recording current corresponding to a condition under which the optimum track width TWopt has been computed, as an optimum recording current Iwopt to the data read/write processing unit 160a.

Figure 2:
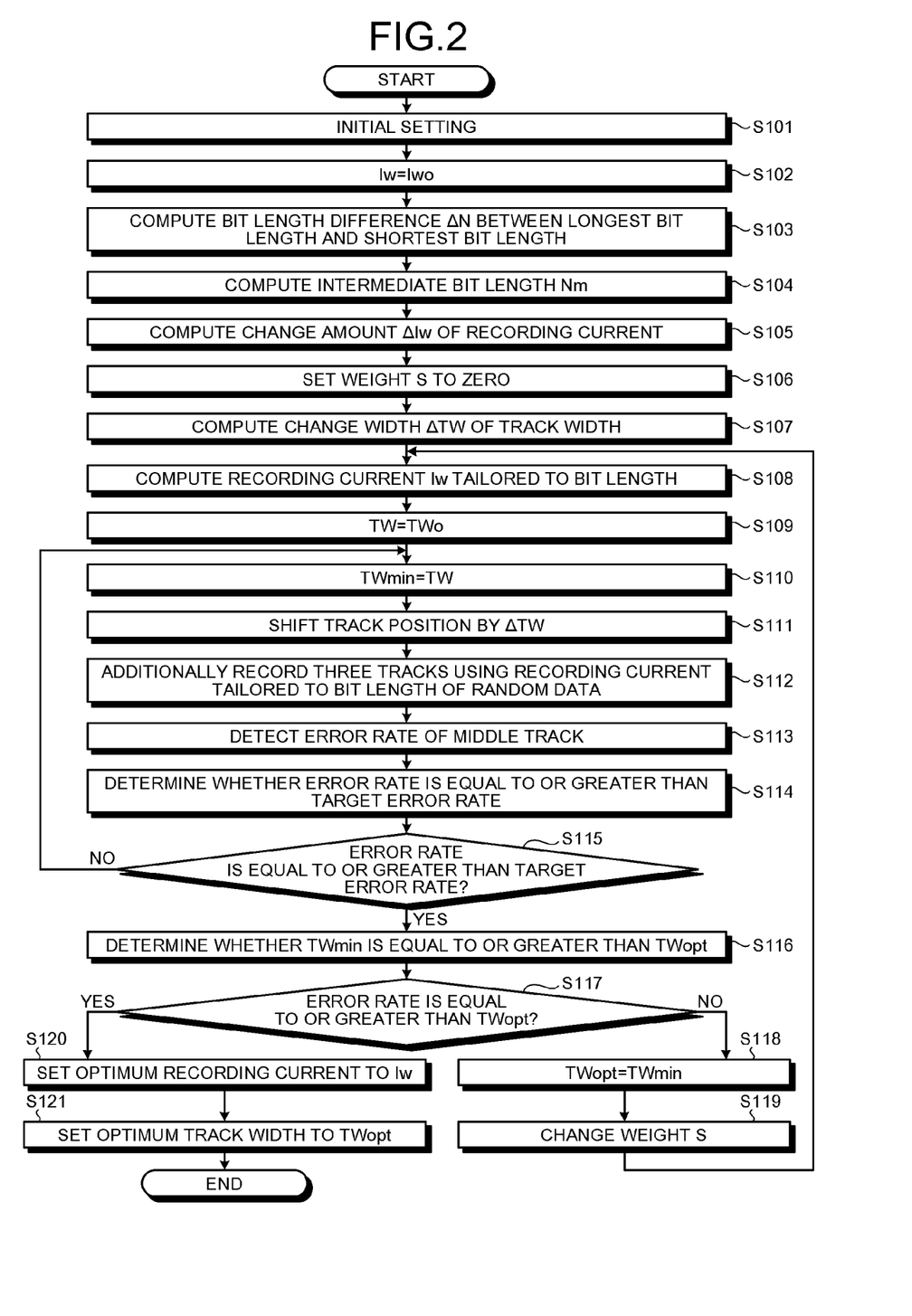
FIG. 2 is a flowchart of procedural steps carried out by the magnetic disk apparatus according to the first embodiment.

Next, procedural steps carried out by the magnetic disk apparatus 100 according to the first embodiment will be explained. FIG. 2 is a flowchart of the procedural steps carried out by the magnetic disk apparatus 100 according to the first embodiment. As illustrated in FIG. 2, the computation processing unit 160b in the magnetic disk apparatus 100 performs initial setting (step S101). In step S101, the computation processing unit 160b calculates the longest bit length and the shortest bit length based on the data stored in the buffer memory 140 and registers these bit lengths in the initial setting data 150a.

Next, the computation processing unit 160b sets the recording current Iw to the initial recording current value Iwo (step S102), computes a bit-length difference ΔN between the longest bit length and the shortest bit length (step S103), and computes the intermediate bit length Nm (step S104).

Then, the computation processing unit 160b computes the change amount ΔIw of recording current based on the equation (1) (step S105) and sets the weight S to zero (step S106). The computation processing unit 160b then computes the change width ΔTW of track width based on the equation (2) (step S107) and computes the recording current Iw tailored to the bit length based on the equation (3) (step S108).

The computation processing unit 160b sets the track width TW to the single track width TWo (step S109) and sets TWmin to TW (step S110). Then, the computation processing unit 160b shifts the track position by ΔTW (step S111) and performs the additional recording of three tracks by using the recording current tailored to the bit length of the random data (step S112).

The computation processing unit 160b detects an error rate of a middle track of the additionally recorded tracks (step S113) and determines whether the error rate is equal to or greater than the target error rate (step S114). If the error rate is less than the target error rate (No at step S115), step S110 is performed.

If the error rate is equal to or greater than the target error rate (Yes at step S115), the computation processing unit 160b determines whether TWmin is equal to or greater than TWopt (step S116).

If TWmin is less than TWopt (No at step S117), the computation processing unit 160b sets the value of TWopt to the value of TWmin (step S118) and changes the weight S (step S119). Then, step S108 is performed. In step S119, the computation processing unit 160b may change the weight S in any manner, for example, by adding a predetermined value to the weight S.

If TWmin is equal to or greater than TWopt (Yes at step S117), the computation processing unit 160b sets the optimum recording current to Iw (step S120) and sets the optimum track width to TWopt (step S121).

As described above, the magnetic disk apparatus 100 according to the first embodiment decreases the recording current by the amount corresponding to the increase in the bit length of the data to be recorded and increases the recording current by the amount corresponding to a decrease in the bit length of the data, when recording the data while narrowing down the track width on the magnetic disk 110. The magnetic disk apparatus 100 records data by using the recording current while changing the track width to narrow down the track width, determines the track width immediately before the track width for which the error rate of the recorded data becomes equal to or greater than the target error rate, and records data on the magnetic disk 110 by using the determined track width and the adjusted recording current. Therefore, the recording current and the track width can be efficiently optimized.

[b] Second Embodiment

Next, an outline of a magnetic disk apparatus according to a second embodiment will be explained. The magnetic disk apparatus according to the second embodiment extracts frequency components of data to be recorded and associates the frequency components with bit lengths. The magnetic disk apparatus includes a recording current management table storing therein a plurality of types of combinations of a bit length and a recording current. The magnetic disk apparatus optimizes a recording current by using the recording current management table.

Figure 3:
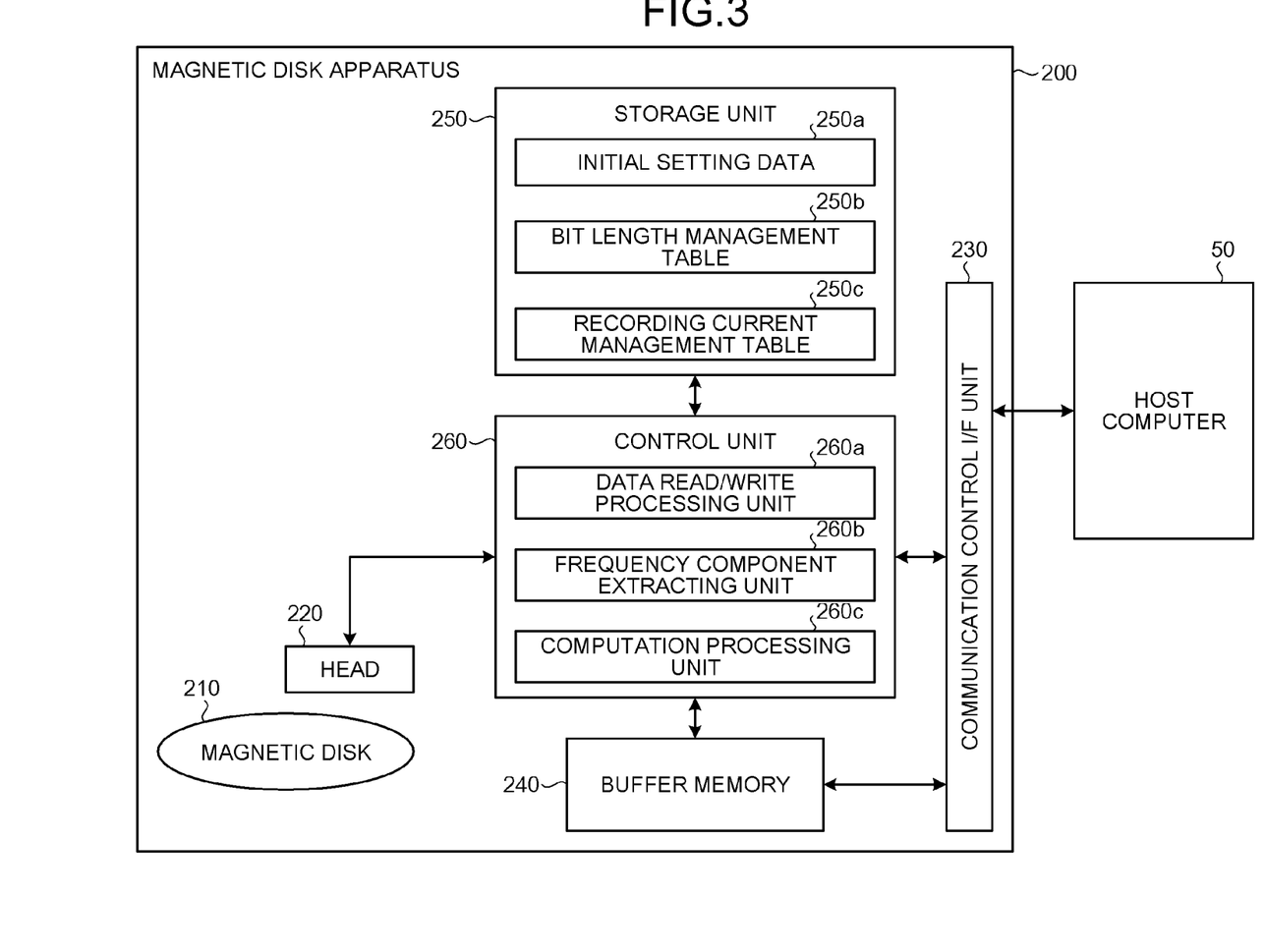
FIG. 3 is a functional block diagram of a configuration of a magnetic disk apparatus according to a second embodiment.

FIG. 3 is a functional block diagram of a configuration of a magnetic disk apparatus 200 according to the second embodiment. As illustrated in FIG. 3, the magnetic disk apparatus 200 includes a magnetic disk 210, a head 220, a communication control I/F unit 230, a buffer memory 240, a storage unit 250, and a control unit 260. Because other structural elements are similar to a well-known magnetic disk apparatus, descriptions thereof are omitted.

The magnetic disk 210 is a disk on which a magnetic material has been applied or vapor-deposited. On the magnetic disk 210, information is recorded by magnetizing the magnetic material on the magnetic disk 210 using the head 220. The head 220 is controlled by the control unit 260, and records data onto and reads data from the magnetic disk 210.

The communication control I/F unit 230 controls data communications between the magnetic disk apparatus 200 and the host computer 50. The buffer memory 240 temporarily stores therein data to be recorded on the magnetic disk 210 or data read from the magnetic disk 210 or both.

The storage unit 250 stores therein data, and a program or programs required for various types of processes by the control unit 260. Particularly, the storage unit 250 according to the second embodiment includes initial setting data 250a, a bit length management table 250b, and a recording current management table 250c.

The initial setting data 250a are utilized to compute an optimum track width and an optimum recording current by a computation processing unit 260c. Specifically, the initial setting data 250a include a longest bit length (Na bits), a shortest bit length (Nb bits), an initial recording current value Iwo, a single track width TWo (TWopt), and a target error rate ERRo.

Descriptions on the longest bit length, the shortest bit length, the initial recording current value Iwo, the single track width Two, and the target error rate ERRo are similar to those according to the first embodiment.

Figure 4:
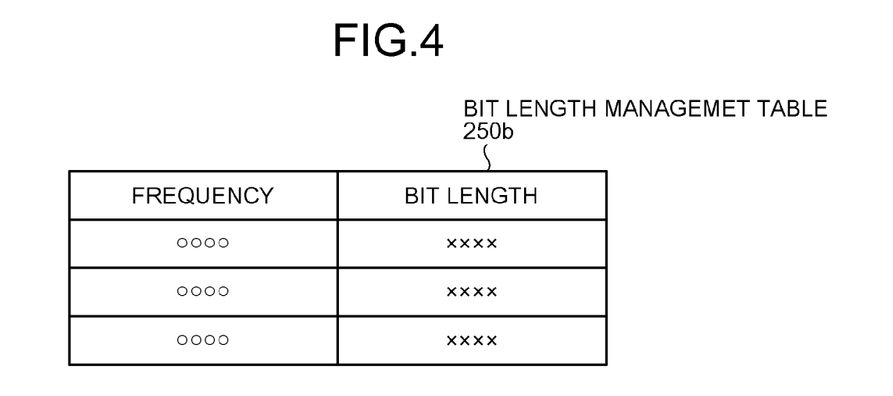
FIG. 4 is a diagram of an example of a data structure of a bit length management table according to the second embodiment.

The bit length management table 250b is a table including frequencies and bit lengths in association with each other. FIG. 4 is a diagram of an example of a data structure of the bit length management table 250b according to the second embodiment. As illustrated in FIG. 4, the bit length management table 250b includes the frequencies and the bit lengths correspondingly with each other.

Figure 5:
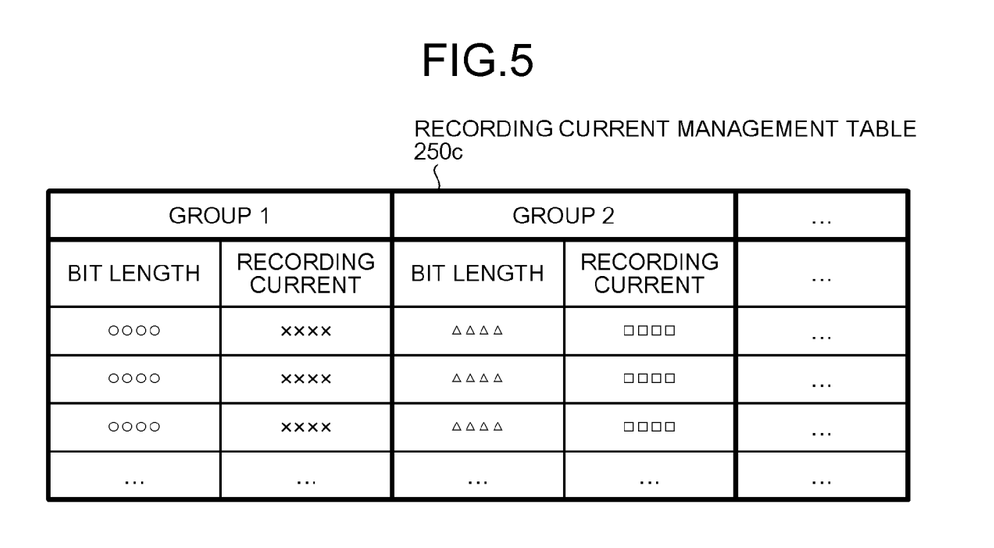
FIG. 5 is a diagram of an example of a data structure of a recording current management table according to the second embodiment.

The recording current management table 250c is a table for managing bit lengths and recording currents in association with each other. The recording current management table 250c holds a plurality of types of combinations of a bit length and a recording current. FIG. 5 is a diagram of an example of a data structure of the recording current management table 250c according to the second embodiment. As illustrated in FIG. 5, the recording current management table 250c includes different groups of combinations of a bit length and a recording current.

The control unit 260 controls the head 220 to perform recording and reading of data on and from the magnetic disk 210. Particularly, the control unit 260 optimizes a track width and a recording current when recording data while narrowing down the track width. As illustrated in FIG. 3, the control unit 260 includes a data read/write processing unit 260a, a frequency component extracting unit 260b, and a computation processing unit 260c.

The data read/write processing unit 260a controls the head 220 to perform the recording and reading of data on the magnetic disk 210. The data read/write processing unit 260a performs the recording of data based on the optimum track width and recording current computed by the computation processing unit 260c. The data to be recorded are stored in the buffer memory 240. Further, the data read/write processing unit 260a reads data recorded on the magnetic disk 210, and stores the read data in the buffer memory 240.

The frequency component extracting unit 260b extracts a frequency component of each data stored in the buffer memory 240. The frequency component extracting unit 260b may use any well-known method of extracting a frequency from data.

The frequency component of data is low when the same bits continues (for example, like data "1111111") and is high when different bits are alternately included (for example, like data "10101010"). The frequency component extracting unit 260b outputs frequency information extracted from the data to the computation processing unit 260c.

The computation processing unit 260c computes a track width and a recording current for recording the data on the magnetic disk 210. The computation processing unit 260c outputs information on the computed track width and recording current to the data read/write processing unit 260a. Processes carried out by the computation processing unit 260c will be specifically explained below.

The computation processing unit 260c acquires a frequency of each data, compares the frequency of the data to be recorded on the magnetic disk 210 with the bit length management table 250b, and determines a bit length of the data to be recorded. The computation processing unit 260c compares the determined bit length and the recording current management table 250c and calculates a recording current. Initially, the computation processing unit 260c calculates a recording current from a relationship between bit lengths and recording currents stored in group 1 (see FIG. 5). When changing the calculated recording current into another recording current, the computation processing unit 260c changes the group, for example, to group 2, and newly calculates a recording current from a relationship between bit lengths and recording currents included in the changed group (group 2).

The computation processing unit 260c calculates an optimum track width for recording data on the magnetic disk 210. The computation processing unit 260c shifts the single track width TWo by ΔTW and additionally records n tracks (for example, three tracks) having a new track width (TW=TW−ΔTW) by using the recording current Iw tailored to the bit length of random data.

The computation processing unit 260c detects an error rate (EER) of a middle track of the additionally recorded n tracks. If the detected error rate is smaller than the target error rate (ERRo), the computation processing unit 260c further shifts the track position by ΔTW to narrow down the track width, and additionally records n tracks having the narrowed track width again.

The computation processing unit 260c repeatedly performs the additional recording until the error rate becomes equal to or larger than the target error rate. The computation processing unit 260c sets a track width immediately before a track width at which the error rate becomes equal to or larger than the target error rate as a minimum track width TWmin.

If the set minimum width TWmin is smaller than the optimum track-width value TWopt, the computation processing unit 260c replaces the values of TWmin and TWopt by new values and changes a recording current (changes the present group in the recording current management table to another group and again calculates a recording current corresponding to a bit length). The computation processing unit 260c again calculates a recording current and a minimum track width TWmin. An initial value of the optimum track-width value TWopt is set by the administrator.

If the set minimum track width TWmin is equal to or greater than the optimum track-width value TWopt, the computation processing unit 260c outputs the track width TWopt as an optimum track width to the data read/write processing unit 260a. Moreover, the computation processing unit 260c outputs a recording current corresponding to a condition under which the optimum track width TWopt has been computed, as an optimum recording current Iwopt to the data read/write processing unit 260a.

Figure 6:
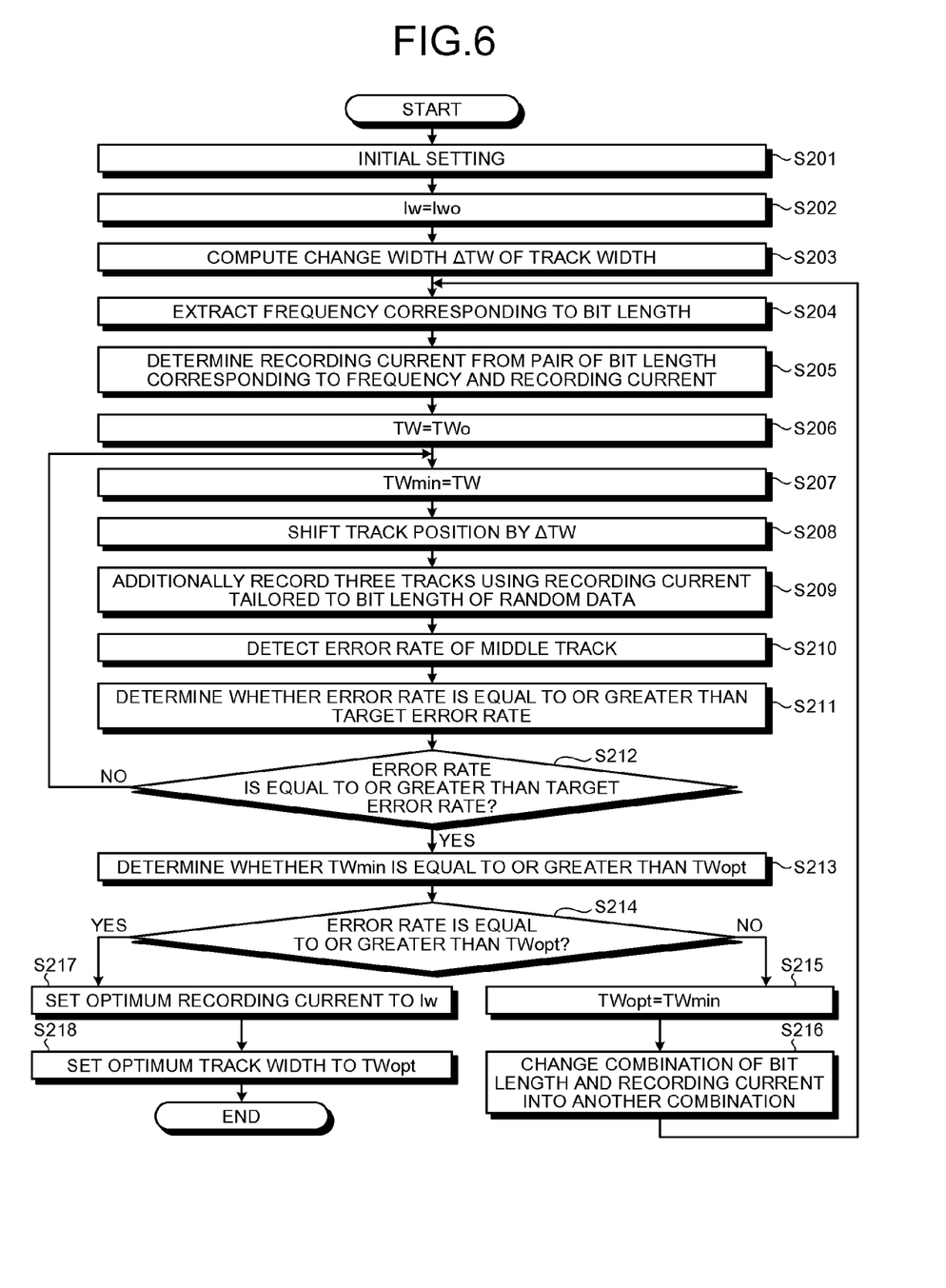
FIG. 6 is a flowchart of procedural steps carried out by the magnetic disk apparatus according to the second embodiment.

Next, procedural steps carried out by the magnetic disk apparatus 200 according to the second embodiment will be explained. FIG. 6 is a flowchart of the procedural steps carried out by the magnetic disk apparatus 200 according to the second embodiment. As illustrated in FIG. 6, the computation processing unit 260c in the magnetic disk apparatus 200 performs the initial setting (step S201) sets the recording current Iw to the initial recording current Iwo (step S202), and computes the change width ΔTW of the track width based on the equation (2) (step S203).

The frequency component extracting unit 260b extracts the frequency corresponding to the bit length (step S204). The computation processing unit 260c determines the recording current from the pair (the pair included in a group of the recording current management table 250c) of the bit length corresponding to the frequency and the recording current (step S205).

The computation processing unit 260c sets the track width TW to the single track width TWo (step S206), sets TWmin to TW (step S207), shifts the track position by ΔTW (step S208), and performs the additional recording of three tracks by using the recording current tailored to the bit length of the random data (step S209).

The computation processing unit 260c detects the error rate of the middle track of the additionally recorded three tracks (step S210) and determines whether the error rate is equal to or greater than the target error rate (step S211). If the error rate is less than the target error rate (No at step S212), step S207 is carried out.

If the error rate is equal to or greater than the target error rate (Yes at step S212), the computation processing unit 260c determines whether TWmin is equal to or greater than TWopt (step S213).

If TWmin is less than TWopt (No at step S214), the computation processing unit 260c sets the value of TWopt to the value of TWmin (step S215) and changes the group in the recording current management table 250c to change the combination of the bit length and the recording current to another combination to calculate a new recording current (step S216) and proceeds to step S204.

If TWmin is equal to or greater than TWopt (Yes at step S214), the computation processing unit 260c sets the optimum recording current to Iw (step S217) and sets the optimum track width to TWopt (step S218).

As described above, the magnetic disk apparatus 200 according to the second embodiment adjusts a recording current based on the recording current management table 250c when recording the data while narrowing down the track width on the magnetic disk 210. Furthermore, the magnetic disk apparatus 200 records the data by using the recording current while changing and narrowing down the track width, determines the track width just before the track width at which the error rate of the recorded data becomes equal to or greater than the target error rate, and records the data on the magnetic disk 210 by using the determined track width and the adjusted recording current. Therefore, the recording current and the track width are efficiently optimized.

All or a part of the processes described as being automatically performed may be manually performed. All or a part of the processes described as being manually performed may be automatically performed by a well-known method. Further, procedural steps, control steps, specific names, and information including various types of data and parameters, which are described above and illustrated in the drawings, may be arbitrarily changed except as otherwise specified.

As described above, according to an aspect of the present invention, the intermediate bit length is calculated, the recording current is calculated based on the intermediate bit length and the bit length of the data to be recorded, the error rate is detected for the case in which the data is recorded by the calculated recording current while narrowing down the track width, and the data is recorded with the track width immediately before the track width at which the error rate becomes equal to or greater than the predetermined value. As a result, the optimum recording current and the optimum track width are obtained efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A magnetic disk apparatus comprising:
    a computing unit that obtains data to be recorded on a magnetic disk and computes an intermediate bit length based on a longest bit length and a shortest bit length of bit lengths of the obtained data;
    an adjusting unit that adjusts a strength of a recording current for recording the obtained data based on a difference between the intermediate bit length and a bit length of the obtained data; and
    a recording unit that repeatedly detects an error rate for recording data by using the adjusted recording current while narrowing down a track width on the magnetic disk and records the obtained data with a track width corresponding to an error rate detected immediately before an error rate that is detected to be equal to or greater than a predetermined value.

2. The magnetic disk apparatus according to claim 1, wherein the recording unit
    changes the track width for the detection based on a change width obtained by dividing a standard track width of the magnetic disk by a predetermined number;
    records the data on a plurality of tracks by using the adjusted recording current; and
    detects the error rate by detecting an error rate of data recorded on a part of the plurality of tracks.

3. The magnetic disk apparatus according to claim 1, wherein
    the computing unit computes a difference between the longest bit length and the shortest bit length, and
    the adjusting unit adjusts the recording current by a value obtained by dividing an initial value of the recording current by the difference.

4. The magnetic disk apparatus according to claim 1, further comprising:
    an extracting unit that extracts a frequency component of the data to be recorded on the magnetic disk; and
    a recording current management unit that associates the frequency component with a bit length and records a plurality of types of combinations of the bit length and a recording current, wherein
    the recording unit adjusts the strength of the recording current based on a result of the extraction by the extracting unit and information managed by the recording current managing unit.

5. A recording method carried out by a magnetic recording apparatus that records data on a magnetic disk, the method comprising:
    obtaining data to be recorded on a magnetic disk;
    computing an intermediate bit length based on a longest bit length and a shortest bit length of bit lengths of the obtained data;
    adjusting a strength of a recording current for recording the obtained data based on a difference between the intermediate bit length and a bit length of the obtained data; and
    repeatedly detecting an error rate for recording data by using the adjusted recording current while narrowing down a track width on the magnetic disk and recording the obtained data with a track width corresponding to an error rate detected immediately before an error rate that is detected to be equal to or greater than a predetermined value.

6. The recording method according to claim 5, further comprising:
    changing the track width for the detection based on a change width obtained by dividing a standard track width of the magnetic disk by a predetermined number;
    recording the data on a plurality of tracks by using the adjusted recording current; and detecting the error rate by detecting an error rate of data recorded on a part of the plurality of tracks.

7. The recording method according to claim 5, further comprising:

computing a difference between the longest bit length and the shortest bit length; and adjusting the recording current by a value obtained by dividing an initial value of the recording current by the difference.

8. The recording method according to claim 5, further comprising:

extracting a frequency component of the data to be recorded on the magnetic disk;

associating the frequency component with a bit length and recording a plurality of types of combinations of the bit length and a recording current; and adjusting the strength of the recording current based on a result of the extraction of the frequency component and the recorded information.

* * * * *